US012651003B2

(12) United States Patent
Roberts

(10) Patent No.: US 12,651,003 B2
(45) Date of Patent: Jun. 9, 2026

(54) DATA GROUP SYNCHRONIZATION

(71) Applicant: Micron Technology, Inc., Boise, ID (US)

(72) Inventor: David A. Roberts, Wellesley, MA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/774,267

(22) Filed: Jul. 16, 2024

(65) Prior Publication Data

US 2026/0023756 A1     Jan. 22, 2026

(51) Int. Cl.
*G06F 16/00*      (2019.01)
*G06F 16/242*     (2019.01)
*G06F 16/27*      (2019.01)

(52) U.S. Cl.
CPC ............ *G06F 16/27* (2019.01); *G06F 16/242* (2019.01)

(58) Field of Classification Search
CPC ................................ G06F 16/27; G06F 16/242
See application file for complete search history.

(56) References Cited

U.S. PATENT DOCUMENTS

| | | | |
|---|---|---|---|
| 12,386,748 B2 * | 8/2025 | Agarwal | G06F 12/0868 |
| 2008/0052452 A1 * | 2/2008 | Chow | G07C 9/257 |
| | | | 711/E12.001 |
| 2018/0113816 A1 * | 4/2018 | Hellwig | G06F 21/53 |
| 2019/0004910 A1 * | 1/2019 | Guim Bernat | G06F 21/44 |
| 2019/0332296 A1 * | 10/2019 | Liu | G06F 3/0631 |
| 2022/0222178 A1 * | 7/2022 | Agarwal | G06F 12/0868 |
| 2023/0267004 A1 * | 8/2023 | Doshi | H04L 67/141 |
| | | | 713/168 |
| 2024/0022541 A1 * | 1/2024 | Lee | H04L 61/4511 |
| 2025/0053338 A1 * | 2/2025 | Jadon | G06F 12/10 |

* cited by examiner

*Primary Examiner* — Alexander Khong

(74) *Attorney, Agent, or Firm* — Harrity & Harrity, LLP

(57)     ABSTRACT

In some implementations, a controller may obtain, from respective host systems of a plurality of host systems, a plurality of request messages for data associated with a first group identifier of one or more group identifiers. The controller may store the data to a cache of the controller based on obtaining the data from the one or more memory devices. The controller may provide the data to the plurality of host systems based on storing the data to the cache. The controller may identify, based on providing the data, whether each host system of the plurality of host systems has received the data. The controller may provide a plurality of acknowledgment messages to the plurality of host systems based on identifying that each host system of the plurality of host systems has received the data.

22 Claims, 8 Drawing Sheets

300

200

Memory Device(s)
315

Controller
310

325
Group mappings

320
Determine groups

Host Systems
305

300

300

400

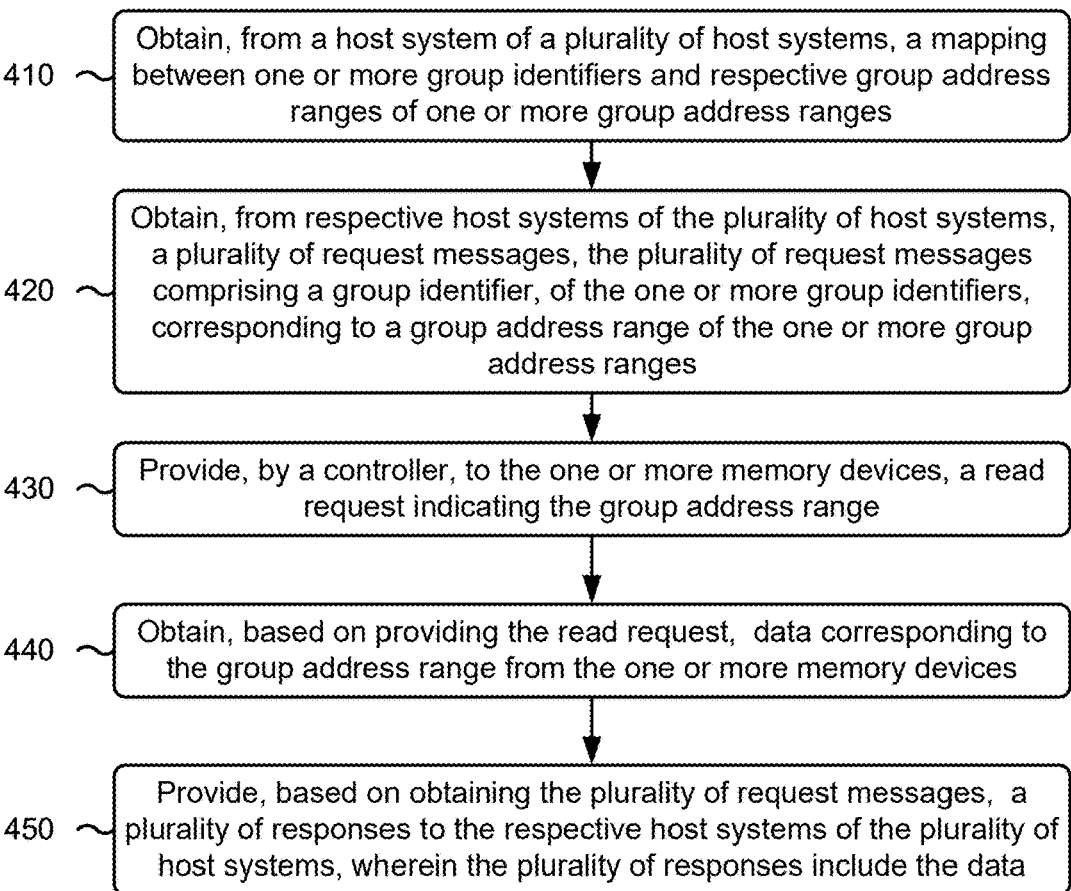

410 — Obtain, from a host system of a plurality of host systems, a mapping between one or more group identifiers and respective group address ranges of one or more group address ranges 420 — Obtain, from respective host systems of the plurality of host systems, a plurality of request messages, the plurality of request messages comprising a group identifier, of the one or more group identifiers, corresponding to a group address range of the one or more group address ranges 430 — Provide, by a controller, to the one or more memory devices, a read request indicating the group address range 440 — Obtain, based on providing the read request, data corresponding to the group address range from the one or more memory devices 450 — Provide, based on obtaining the plurality of request messages, a plurality of responses to the respective host systems of the plurality of host systems, wherein the plurality of responses include the data

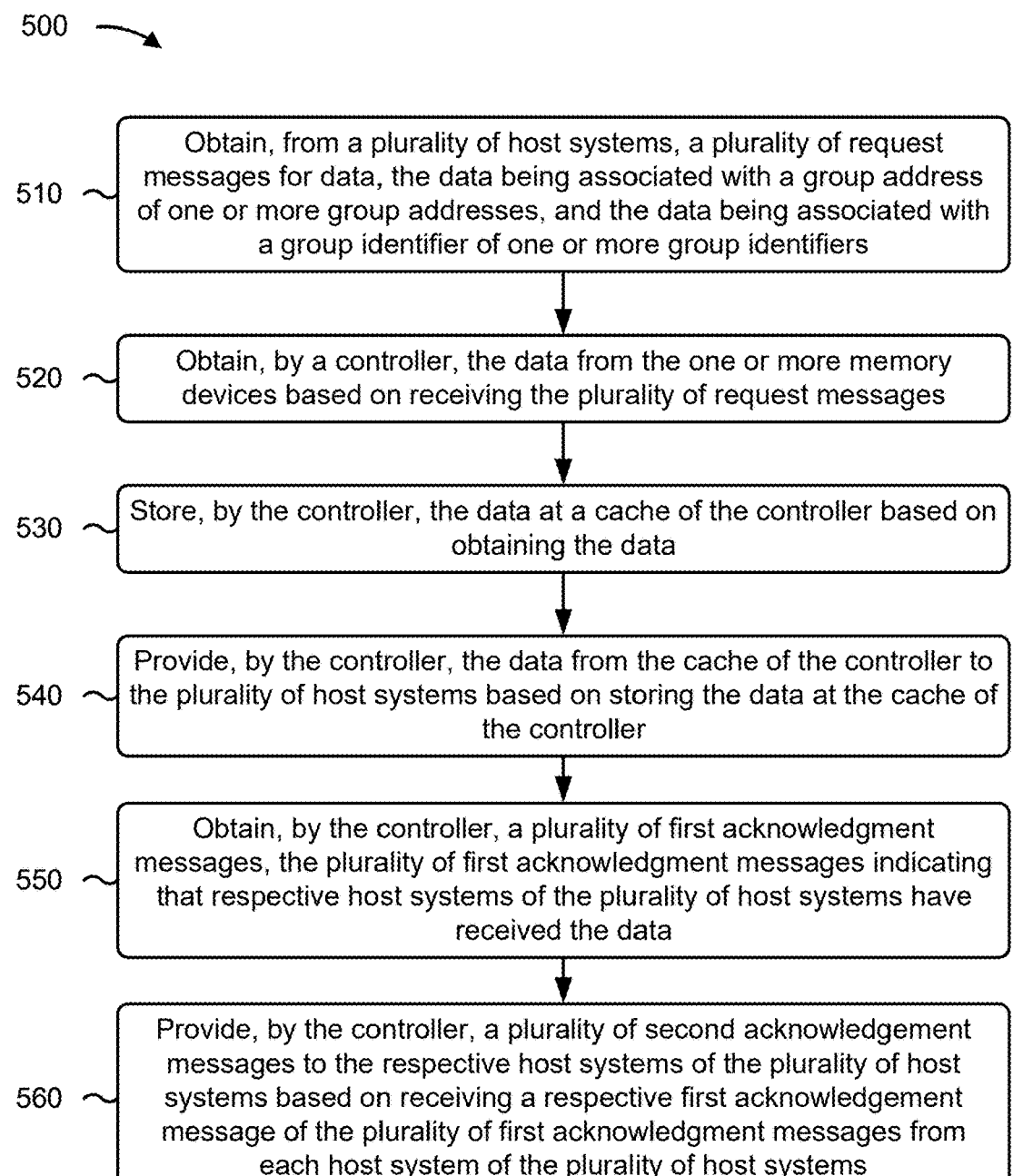

510  Obtain, from a plurality of host systems, a plurality of request messages for data, the data being associated with a group address of one or more group addresses, and the data being associated with a group identifier of one or more group identifiers 520  Obtain, by a controller, the data from the one or more memory devices based on receiving the plurality of request messages 530  Store, by the controller, the data at a cache of the controller based on obtaining the data 540  Provide, by the controller, the data from the cache of the controller to the plurality of host systems based on storing the data at the cache of the controller 550  Obtain, by the controller, a plurality of first acknowledgment messages, the plurality of first acknowledgment messages indicating that respective host systems of the plurality of host systems have received the data 560  Provide, by the controller, a plurality of second acknowledgement messages to the respective host systems of the plurality of host systems based on receiving a respective first acknowledgement message of the plurality of first acknowledgment messages from each host system of the plurality of host systems

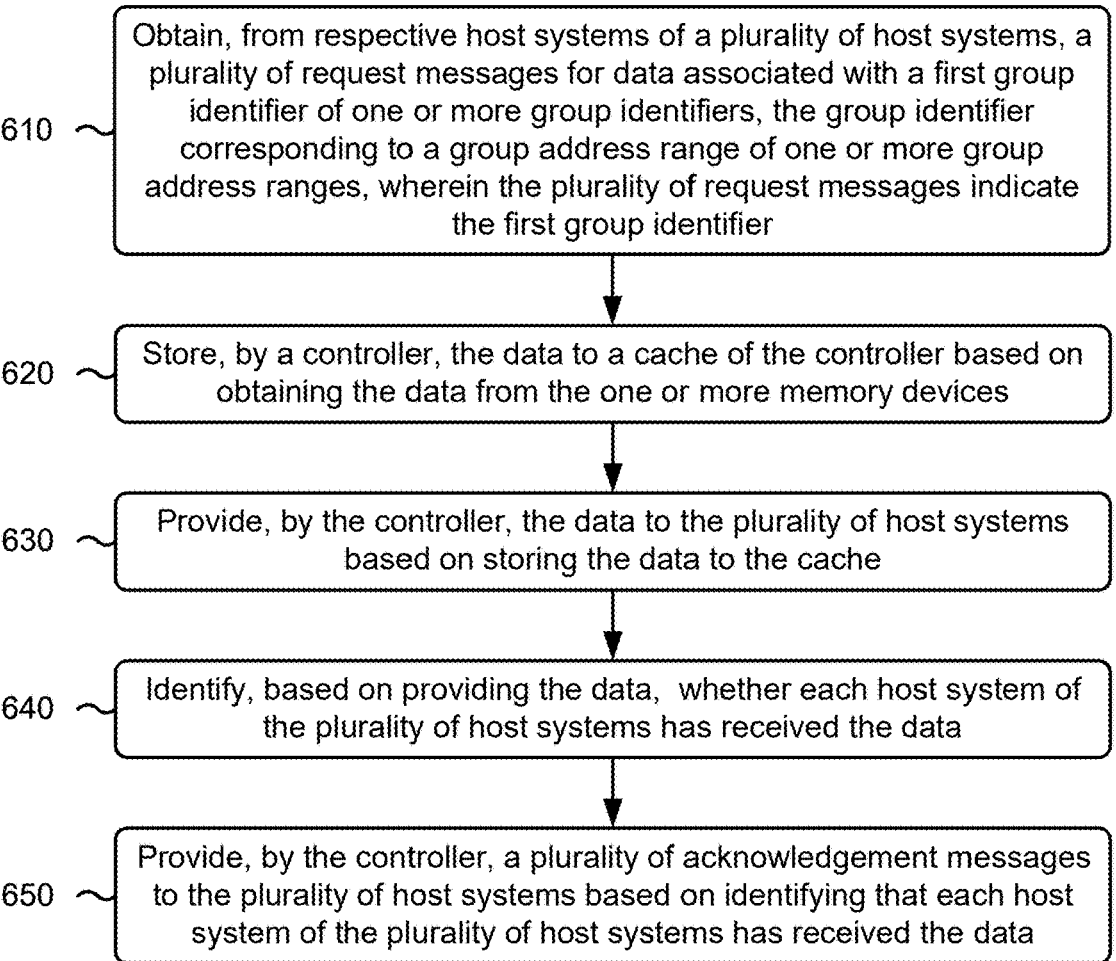

610 — Obtain, from respective host systems of a plurality of host systems, a plurality of request messages for data associated with a first group identifier of one or more group identifiers, the group identifier corresponding to a group address range of one or more group address ranges, wherein the plurality of request messages indicate the first group identifier 620 — Store, by a controller, the data to a cache of the controller based on obtaining the data from the one or more memory devices 630 — Provide, by the controller, the data to the plurality of host systems based on storing the data to the cache 640 — Identify, based on providing the data, whether each host system of the plurality of host systems has received the data 650 — Provide, by the controller, a plurality of acknowledgement messages to the plurality of host systems based on identifying that each host system of the plurality of host systems has received the data

FIG. 6

DATA GROUP SYNCHRONIZATION

TECHNICAL FIELD

The present disclosure generally relates to memory devices, memory device operations, and, for example, to data group synchronization.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

BRIEF DESCRIPTION OF THE DRAWINGS

FIG. 4 is a flowchart of an example method associated with data group synchronization.

FIG. 5 is a flowchart of an example method associated with data group synchronization.

FIG. 6 is a flowchart of an example method associated with data group synchronization.

DETAILED DESCRIPTION

Figure 1:
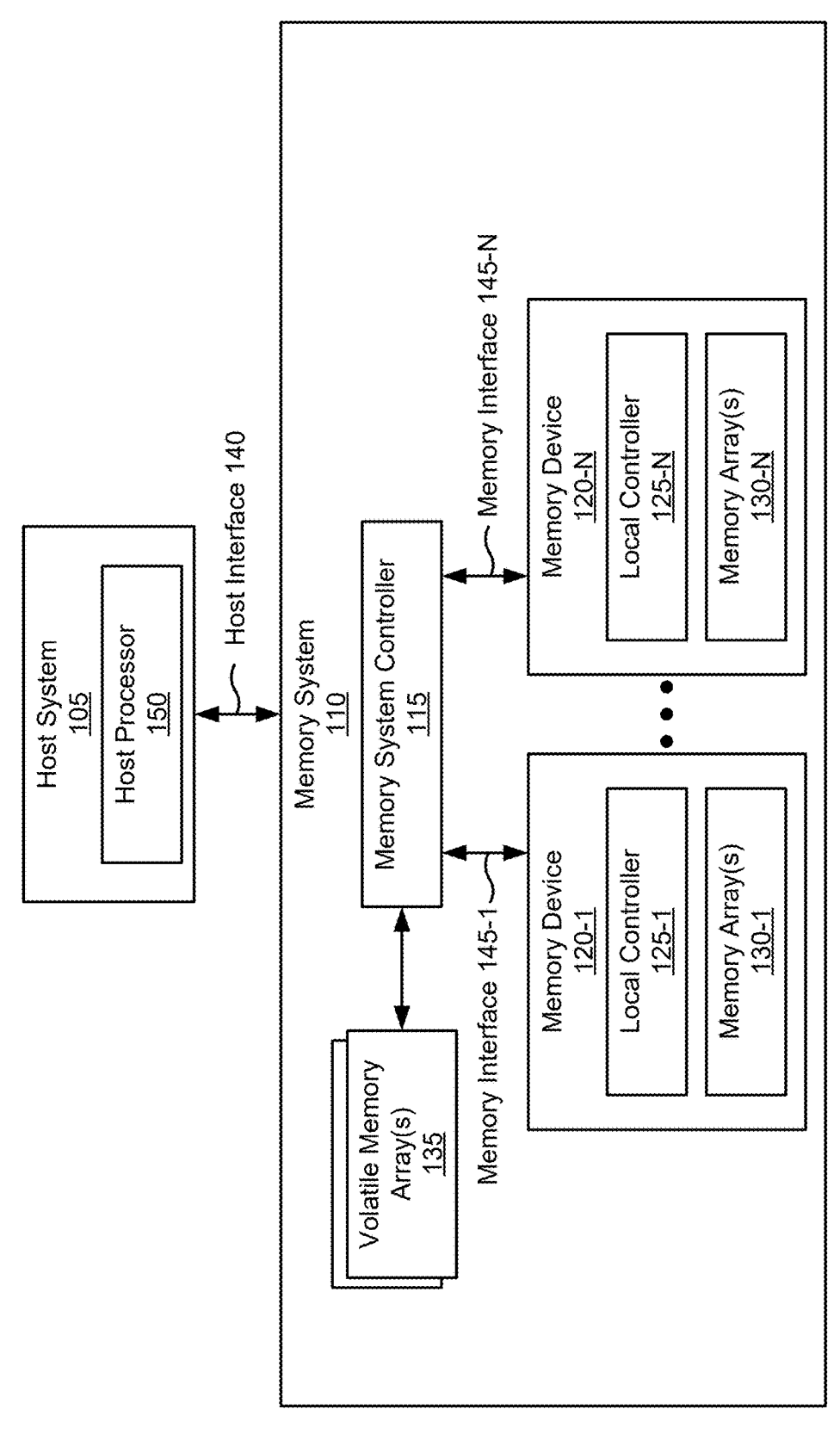
FIG. 1 is a diagram illustrating an example system capable of data group synchronization.

Some computing systems, such as computing systems that operate according to a compute express link (CXL) protocol, may implement a machine learning model to process one or more queries using a set of parameters associated with the machine learning model. For example, to process a query using a neural network, a computing system may access parameters corresponding to one or more layers of the neural network and apply the parameters to the query. In some examples, the computing system may process multiple queries (e.g., in parallel and/or in series), and accordingly may access the same parameter(s) multiple times. To support such processing, the computing system may include multiple host systems, such as central processing units (CPUs), graphics processing units (GPUs), and/or accelerators, in communication with a shared memory system. A shared memory system may include one or more memory devices organized according to a virtual address space. The host systems may access the one or more memory devices, such that data stored to the one or more memory devices may be shared between the host systems. Because the size of a layer of the neural network may exceed the size of on-board (e.g., local) memory of the host systems (e.g., on-board caches, high-bandwidth memory), the host systems may store and retrieve parameters corresponding to layers of the neural network using the shared memory system. Such storing may be referred to as offloading.

However, if the host systems do not coordinate requests to the shared memory system, then inefficient memory accesses may occur. For example, if each host system requests data associated with the same layer of a neural network, then the shared memory system may retrieve and transmit identical data multiple times. This repeated data access may increase the traffic between the host systems and the shared memory system. Some memory systems may include a cache to store commonly accessed data. However, un-coordinated read requests from the host systems may result in "thrashing" of the cache, in which data is repeatedly stored to and removed from the cache, thus reducing performance. This may increase power consumption of the computing system and/or reduce performance of the computing system (e.g., increase latency and/or decrease the rate at which data is accessed).

Some implementations described herein enable data group synchronization. For example, one or more host systems may determine one or more groups associated with a machine learning model, such as a neural network. Each group may correspond to a respective set of parameters of the machine learning model (e.g., the one or more groups may be associated with respective sets of parameters and/or respective layers of the machine learning model). As part of determining the group(s), the host system(s) may assign a respective group identifier, such as an ordinal number or ordinal value, to each group. Additionally, the host systems may assign a respective group address range (e.g., an address range corresponding to the location of data of a group) to each group. In some implementations, the host systems may configure the size of a group to be less than or equal to the size of a cache of a controller of the memory system. In some cases, the host systems may provide a mapping between the group identifiers and the group address ranges to the controller.

The host system(s) may provide a plurality of read requests for a group to the controller. In response to, based on, or otherwise associated with obtaining the plurality of read requests, the controller may provide a single read request (e.g., one read request) to one or more memory devices of the memory system. The controller may store the data to a temporary storage location (e.g., a cache) of the controller. The controller may provide one or more responses that include the data to the host systems (e.g., via the cache). For example, the controller may provide a response to each host system in response to respective read requests. Alternatively, the controller may broadcast the data to the host systems, as described in greater detail elsewhere herein.

In some implementations, the host system(s) may provide a plurality of processed acknowledgment messages indicating that respective host systems have processed the data to the controller. The controller may identify whether each host system has processed the data based on obtaining a processed acknowledgment message from each host system.

Based on identifying that each host system has processed the data, the controller may provide a plurality of completion acknowledgment messages to respective host systems of the one or more host systems. Based on obtaining the plurality of completion acknowledgment messages, the host system(s) may proceed to obtaining parameter(s) for a subsequent group. For example, the host system(s) may provide a plurality of read requests for data associated with the subsequent group to the controller.

As a result, by synchronizing data requests as described herein, the memory system may improve efficiency of providing data associated with a machine learning model to the host systems. For example, because host systems may configure the size of a group to correspond to the size of the cache of the controller, the controller may store all or a portion of the data associated with a group to the cache. This may allow the controller to provide the data to the host systems via the cache, which may reduce the latency associated with the plurality of read requests. Additionally, because the host systems may provide an indication of the groups to the controller (e.g., via the mapping and/or one or more lock-down commands), the controller may provide a single request to the memory device(s). This may reduce traffic between the controller and the memory device(s) and/or reduce latency. Further, by broadcasting the data, the controller may reduce latency associated with providing the data to the host systems. For example, by providing copies of the data associated with a group to the host systems concurrently, the controller may reduce the time used to provide the data, compared with providing the data non-concurrently (e.g., serially). Additionally, by broadcasting the data, the controller may reduce the traffic (e.g., quantity of transmissions) between the controller and the host systems, which may improve system performance.

FIG. 1 is a diagram illustrating an example system 100 capable of data group synchronization. The system 100 may include one or more devices, apparatuses, and/or components for performing operations described herein. For example, the system 100 may include a host system 105 and a memory system 110. The memory system 110 may include a memory system controller 115 and one or more memory devices 120, shown as memory devices 120-1 through 120-N (where N≥1). In some examples, the memory system controller 115 may be or may include a memory switch, such as a CXL switch. A memory device may include a local controller 125 and one or more memory arrays 130. The host system 105 may communicate with the memory system 110 (e.g., the memory system controller 115 of the memory system 110) via a host interface 140. The memory system controller 115 and the memory devices 120 may communicate via respective memory interfaces 145, shown as memory interfaces 145-1 through 145-N (where N≥1).

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host system 105 may include a host processor 150. The host processor 150 may include one or more processors configured to execute instructions and store data in the memory system 110. For example, the host processor 150 may include a central processing unit (CPU), a graphics processing unit (GPU), a field-programmable gate array (FPGA), an application-specific integrated circuit (ASIC), and/or another type of processing component.

The memory system 110 may be any electronic device or apparatus configured to store data in memory. For example, the memory system 110 may be a hard drive, a solid-state drive (SSD), a flash memory system (e.g., a NAND flash memory system or a NOR flash memory system), a universal serial bus (USB) drive, a memory card (e.g., a secure digital (SD) card), a secondary storage device, a non-volatile memory express (NVMe) device, an embedded multimedia card (eMMC) device, a dual in-line memory module (DIMM), and/or a random-access memory (RAM) device, such as a dynamic RAM (DRAM) device or a static RAM (SRAM) device.

The memory system controller 115 may be any device configured to control operations of the memory system 110 and/or operations of the memory devices 120. For example, the memory system controller 115 may include control logic, a memory controller, a system controller, an ASIC, an FPGA, a processor, a microcontroller, and/or one or more processing components. In some implementations, the memory system controller 115 may communicate with the host system 105 and may instruct one or more memory devices 120 regarding memory operations to be performed by those one or more memory devices 120 based on one or more instructions from the host system 105. For example, the memory system controller 115 may provide instructions to a local controller 125 regarding memory operations to be performed by the local controller 125 in connection with a corresponding memory device 120.

A memory device 120 may include a local controller 125 and one or more memory arrays 130. In some implementations, a memory device 120 includes a single memory array 130. In some implementations, each memory device 120 of the memory system 110 may be implemented in a separate semiconductor package or on a separate die that includes a respective local controller 125 and a respective memory array 130 of that memory device 120. The memory system 110 may include multiple memory devices 120.

A local controller 125 may be any device configured to control memory operations of a memory device 120 within which the local controller 125 is included (e.g., and not to control memory operations of other memory devices 120). For example, the local controller 125 may include control logic, a memory controller, a system controller, an ASIC, an FPGA, a processor, a microcontroller, and/or one or more processing components. In some implementations, the local controller 125 may communicate with the memory system controller 115 and may control operations performed on a memory array 130 coupled with the local controller 125 based on one or more instructions from the memory system controller 115. As an example, the memory system controller 115 may be an SSD controller, and the local controller 125 may be a NAND controller.

A memory array 130 may include an array of memory cells configured to store data. For example, a memory array 130 may include a non-volatile memory array (e.g., a NAND memory array or a NOR memory array) or a volatile memory array (e.g., an SRAM array or a DRAM array). In some implementations, the memory system 110 may include one or more volatile memory arrays 135. A volatile memory array 135 may include an SRAM array and/or a DRAM array, among other examples. The one or more volatile memory arrays 135 may be included in the memory system controller 115, in one or more memory devices 120, and/or in both the memory system controller 115 and one or more memory devices 120. In some implementations, the memory system 110 may include both non-volatile memory capable of maintaining stored data after the memory system 110 is powered off and volatile memory (e.g., a volatile memory array 135) that requires power to maintain stored data and that loses stored data after the memory system 110 is powered off. For example, a volatile memory array 135 may cache data read from or to be written to non-volatile memory, and/or may cache instructions to be executed by a controller of the memory system 110.

The host interface 140 enables communication between the host system 105 (e.g., the host processor 150) and the memory system 110 (e.g., the memory system controller 115). The host interface 140 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, an eMMC interface, a double data rate (DDR) interface, a DIMM interface, and/or a CXL interface.

The memory interface 145 enables communication between the memory system 110 and the memory device 120. The memory interface 145 may include a non-volatile memory interface (e.g., for communicating with non-volatile memory), such as a NAND interface or a NOR interface. Additionally, or alternatively, the memory interface 145 may include a volatile memory interface (e.g., for communicating with volatile memory), such as a DDR interface.

Although the example memory system 110 described above includes a memory system controller 115, in some implementations, the memory system 110 does not include a memory system controller 115. For example, an external controller (e.g., included in the host system 105) and/or one or more local controllers 125 included in one or more corresponding memory devices 120 may perform the operations described herein as being performed by the memory system controller 115. Furthermore, as used herein, a "controller" may refer to the memory system controller 115, a local controller 125, or an external controller. In some implementations, a set of operations described herein as being performed by a controller may be performed by a single controller. For example, the entire set of operations may be performed by a single memory system controller 115, a single local controller 125, or a single external controller. Alternatively, a set of operations described herein as being performed by a controller may be performed by more than one controller. For example, a first subset of the operations may be performed by the memory system controller 115 and a second subset of the operations may be performed by a local controller 125. Furthermore, the term "memory apparatus" may refer to the memory system 110 or a memory device 120, depending on the context.

A controller (e.g., the memory system controller 115, a local controller 125, or an external controller) may control operations performed on memory (e.g., a memory array 130), such as by executing one or more instructions. For example, the memory system 110 and/or a memory device 120 may store one or more instructions in memory as firmware, and the controller may execute those one or more instructions. Additionally, or alternatively, the controller may receive one or more instructions from the host system 105 and/or from the memory system controller 115, and may execute those one or more instructions. In some implementations, a non-transitory computer-readable medium (e.g., volatile memory and/or non-volatile memory) may store a set of instructions (e.g., one or more instructions or code) for execution by the controller. The controller may execute the set of instructions to perform one or more operations or methods described herein. In some implementations, execution of the set of instructions, by the controller, causes the controller, the memory system 110, and/or a memory device 120 to perform one or more operations or methods described herein. In some implementations, hardwired circuitry is used instead of or in combination with the one or more instructions to perform one or more operations or methods described herein. Additionally, or alternatively, the controller may be configured to perform one or more operations or methods described herein. An instruction is sometimes called a "command."

For example, the controller (e.g., the memory system controller 115, a local controller 125, or an external controller) may transmit signals to and/or receive signals from memory (e.g., one or more memory arrays 130) based on the one or more instructions, such as to transfer data to (e.g., write or program), to transfer data from (e.g., read), to erase, and/or to refresh all or a portion of the memory (e.g., one or more memory cells, pages, sub-blocks, blocks, or planes of the memory). Additionally, or alternatively, the controller may be configured to control access to the memory and/or to provide a translation layer between the host system 105 and the memory (e.g., for mapping logical addresses to physical addresses of a memory array 130). In some implementations, the controller may translate a host interface command (e.g., a command received from the host system 105) into a memory interface command (e.g., a command for performing an operation on a memory array 130).

In some implementations, the system 100 may include multiple host systems 105. In such implementations, the host systems 105 may communicate with the memory system 110 according to a CXL protocol. In some cases, the memory system may include a switch (e.g., a memory switch, a storage switch) having a set of ports (e.g., channels, interfaces), where each port couples the switch with a respective host system 205. The host systems 105 may share data stored to the memory system 110. For example, the host systems 105 may utilize a common addressing scheme that may allow multiple host systems 105 to access the same data in the memory system 110.

In some implementations, one or more systems, devices, apparatuses, components, and/or controllers of FIG. 1 may be configured to: obtain, from a host system of a plurality of host systems, a mapping between one or more group identifiers and respective group address ranges of one or more group address ranges; obtain, from respective host systems of the plurality of host systems, a plurality of request messages, the plurality of request messages comprising a group identifier, of the one or more group identifiers, corresponding to a group address range of the one or more group address ranges; provide, to the one or more memory devices, a read request indicating the group address range; obtain, based on providing the read request, data corresponding to the group address range from the one or more memory devices; and/or provide, based on obtaining the plurality of request messages, a plurality of responses to the respective host systems of the plurality of host systems, wherein the plurality of responses include the data.

In some implementations, one or more systems, devices, apparatuses, components, and/or controllers of FIG. 1 may be configured to: obtain, from a plurality of host systems, a plurality of request messages for data, the data being associated with a group address of one or more group addresses, and the data being associated with a group identifier of one or more group identifiers; obtain the data from the one or more memory devices based on receiving the plurality of request messages; store the data at a cache of the controller based on obtaining the data; provide the data from the cache of the controller to the plurality of host systems based on storing the data at the cache of the controller; obtain a plurality of first acknowledgment messages, the plurality of first acknowledgment messages indicating that respective host systems of the plurality of host systems have received the data; and/or provide a plurality of second acknowledgment messages to the respective host systems of the plurality of host systems based on receiving a respective first acknowledgment message of the plurality of first acknowledgment messages from each host system of the plurality of host systems.

In some implementations, one or more systems, devices, apparatuses, components, and/or controllers of FIG. 1 may be configured to: obtain, from respective host systems of a plurality of host systems, a plurality of request messages for data associated with a first group identifier of one or more group identifiers, the group identifier corresponding to a group address range of one or more group address ranges, wherein the plurality of request messages indicate the first group identifier; store the data to a cache of the controller based on obtaining the data from the one or more memory devices; provide the data to the plurality of host systems based on storing the data to the cache; identify, based on providing the data, whether each host system of the plurality of host systems has received the data; and/or provide a plurality of acknowledgment messages to the plurality of host systems based on identifying that each host system of the plurality of host systems has received the data.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally, or alternatively, a set of components (e.g., one or more components) shown in FIG. 1 may perform one or more operations described as being performed by another set of components shown in FIG. 1.

Figure 2:
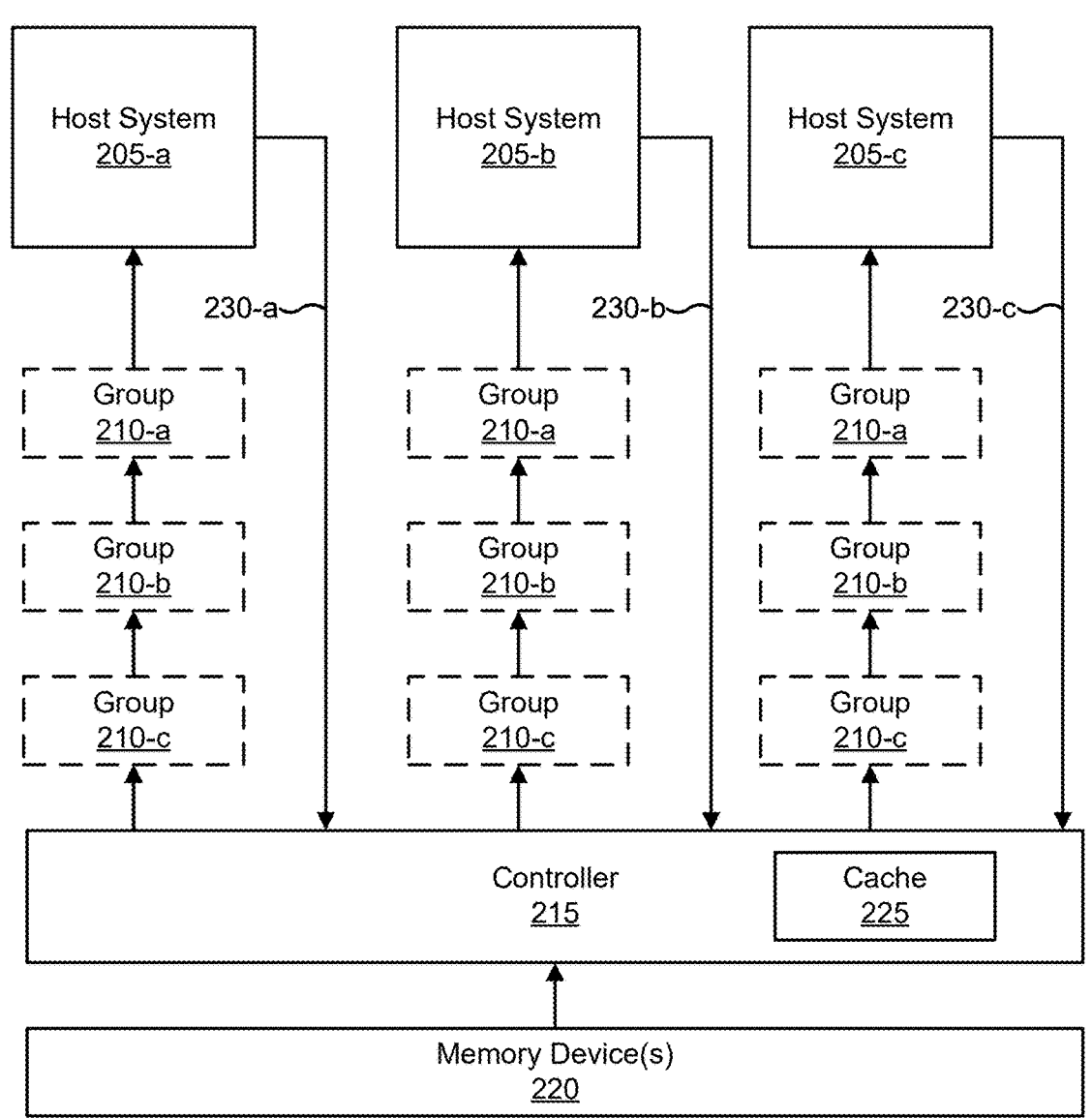
FIG. 2 is a diagram illustrating an example system that supports data group synchronization.

FIG. 2 is a diagram illustrating an example system 200 that supports data group synchronization. The system 200 may include one or more devices, apparatuses, and/or components for performing operations described herein. In some implementations, the system 200 may be a CXL system that communicates in accordance with a PCIe interface. For example, the system 200 may include a plurality of host systems 205. The system 200 may further include a shared memory system (e.g., shared among the host systems 205) that includes a controller 215 and one or more memory devices 220. The shared memory system may be an example of the memory system 110. In some implementations, a host system 205 may be an example of, or may include aspects of, the host system 105 and/or the host processor 150. In some implementations, the memory device(s) 220 may be examples of the memory device(s) 120.

The controller 215 may be an example of a CXL controller, such as a memory system controller 115 of a memory system 110. Additionally, or alternatively, the controller 215 may include logic and circuitry to support communication between the host systems 205 and the memory devices 220. For example, the controller 215 may be an example of a switch (e.g., a memory switch, a storage switch) having a set of ports (e.g., channels, interfaces), where each port couples the controller 215 to a respective host system 205. The controller 215 may include temporary storage location, such as cache 225. The cache 225 may include volatile memory, such as one or more volatile memory arrays 135 and/or one or more SRAM arrays. Additionally, or alternatively, the controller 215 may configure one or more of the memory devices 220 as a cache. The controller 215 may support storing data to the cache 225 and providing the data from the cache 225 to one or more of the host systems 205. Providing the data from the cache 225 may be associated with higher performance (e.g., reduced latency, increased rate of data transfer) compared with providing the data from the memory device(s) 220.

To support processing one or more queries using a machine learning model, such as a neural network, the host systems 205 may organize parameters of the machine learning model into one or more groups 210. For example, if the machine learning model includes a neural network having a set of layers, the host systems 205 may assign each layer, a portion of each layer, or portions of multiple layers, among other examples, to respective groups. The host systems 205 may order the group(s) in accordance with the order in which a query may be processed using the parameters. For example, the host systems 205 may determine that a first set of parameters (e.g., a first layer of a neural network) correspond to a group 210-a, a second set of parameters (e.g., a second layer of a neural network) correspond to a group 210-b, and a third set of parameters (e.g., a third layer of a neural network) correspond to a group 210-c. As part of generating the group(s) 210, the host systems 205 may assign a respective group identifier, such as an ordinal number or ordinal value, to each group 210. Additionally, the host systems 205 may assign a respective group address range to each group 210. A group address range of a group 210 may indicate the location of data associated with the group 210 in the memory device(s) 220 (e.g., a range of one or more logical addresses of the data, a range of one or more physical addresses of the data).

In some implementations, the host systems 205 may determine the group(s) 210 based on storage characteristics of the controller 215 and/or the memory devices 220. For example, a host system 205 may query the controller 215 to identify a size of the cache 225 of the controller 215. The host systems 205 may select a size of a group 210 to be less than or equal to the size of the cache 225, such that the controller 215 may support storing all or a portion of a group 210 to the cache 225.

In some examples, the host systems 205 may provide, and the controller 215 may obtain, a mapping associated with the group(s) 210 to the controller 215. The mapping may include an association between a group identifier of a group 210 and the associated address range of the data of the group 210 (e.g., a group address range of the group 210). In response to, based on, or otherwise associated with obtaining the mapping, the controller 215 may store the mapping (e.g., to a cache 225 or buffer of the controller 215).

The host systems 205 may read the group(s) 210 in accordance with the configuration. For example, the host systems 205 may provide respective request messages for a group 210-a to the controller 215. In some examples, a request message may indicate the group identifier associated with the group 210-a. Additionally, or alternatively, a request message may include the group address range associated with the group 210-a. In some cases, a request message may be an example of a read command. For example, the request message may indicate a size (e.g., a granularity) for data, such as a size of 512 bytes (e.g., for blocks of data), a size of 64 bytes (e.g., for entries or cache lines of the cache 225), or other sizes of data. In some examples, after communicating a request message, the controller 215 may provide, and a host system 205 may obtain, an acknowledgment message. In such examples the host system may wait (e.g., delay one or more operations) until the acknowledgment message is received.

The controller 215 may obtain data associated with a group 210 in response to, based on, or otherwise associated with receiving one or more of the request messages. For example, in response to a request message obtained from the host system 205-a, the controller 215 may provide (e.g., issue, transmit), and the memory device(s) 220 may obtain, a read request. In some examples, controller 215 may identify a subset of the memory device(s) 220 that correspond to the group address range. In such examples, the controller 215 may provide the read request to the identified subset of memory device(s). Alternatively, the controller 215 may obtain data associated with a group 210 in response to, based on, or otherwise associated with obtaining a lock-down command from the host system(s) 205. As described herein, a lock-down command may indicate that the controller 215 is to lock-down data associated with a group 210 to the cache 225. To lock-down the data, the controller 215 may store the data to the cache 225. The controller 215 may refrain from removing the data from cache 225 until instructed by the host systems 205, as described in greater detail elsewhere herein.

For example, the host system 205-a may provide, and the controller 215 may obtain, the lock-down command to indicate that the controller 215 is to lock-down the data associated with the group 210-a. In some examples, the lock-down command may indicate the group identifier associated with the group 210-a and/or may indicate the group address range associated with the group 210-a. In response to obtaining the lock-down command, the controller 215 may provide, and the memory device(s) 220 may obtain, the read request.

The read request may indicate the group address range associated with the group 210-a. In response to, based on, or otherwise associated with obtaining the read request, the memory device(s) 220 may provide, and the controller 215 may obtain, the data associated with the group 210-a. The controller 215 may store the data associated with the group 210-a at the cache 225. In some examples, the controller may lock-down the data to the cache 225. By locking-down data associated with a group 210 (e.g., the group 210-a), the controller 215 may improve performance associated with accessing the data. For example, the controller 215 may provide the data to the host systems 205 via the cache 225 in response to subsequent read requests, which may reduce latency associated with providing the data to the host systems 205.

In some implementations, the controller 215 may provide a single read request to the memory device(s) 220 in response to the request messages from the host system(s) 205. For example, after providing the read request in response to the request message from the host system 205-a, the controller may refrain from providing an additional read request to the memory device(s) in response to receiving a second request message from the host system 205-b. By providing a single read request, the system 200 may improve efficiency of communication between the controller 215 and the memory device(s) 220. For example, the controller 215 may reduce the quantity of read requests (e.g., read requests associated with additional request messages) provided to the memory device(s) 220. This may reduce unnecessary communication between the controller 215 and the memory device(s) 220, thus conserving communication resources that would have otherwise been associated with providing additional communications between the controller 215 and the memory devices 220. This may enable the system 200 to use the communication resources that would have otherwise been associated with providing additional communications between the controller 215 and the memory devices 220 for other operations, thereby improving the performance of the system 200.

In some cases, the controller 215 may provide data associated with the group 210-a to the host systems 205 asynchronously. For example, the controller 215 may provide the data to the host systems 205 in response to obtaining respective commands from the host systems 205 (e.g., the controller 215 may provide the data to the host system 205-a in response to obtaining a read command from the host system 205-a, the controller 215 may provide the data to the host system 205-b in response to obtaining a read command from the host system 205-b, and the controller 215 may provide the data to the host system 205-c in response to obtaining a read command from the host system 205-c).

Alternatively, the controller 215 may provide the data associated with the group 210-a by broadcasting the data to the host systems 205. For example, the controller 215 may include or may be a memory switch. In such examples, the controller 215 may include a set of ports (e.g., channels, interfaces), where each port couples the controller 215 with a respective host system 205. To broadcast the data, the controller 215 may transmit a respective copy of the data to each host system 205 via a respective port. In some cases, the controller 215 may perform such broadcasting concurrently. For example, providing a first copy of the data to the host system 205-a, providing a second copy of the data to the host system 205-b, and providing a third copy of the data to the host system 205-c may at least partially overlap in time. By broadcasting the data, the controller 215 may improve (e.g., reduce) latency associated with providing the data to the host systems 205. For example, by providing copies of the data associated with the group 210-a to the host systems 205 concurrently, the controller 215 may reduce the time used to provide the data, compared with providing the data non-concurrently (e.g., serially).

In some implementations, a host system 205 may provide a processed acknowledgment message 230 to indicate that the host system 205 has processed the data associated with a group 210. For example, a host system 205 may provide the processed acknowledgment message 230 after successfully receiving the data (shown as acknowledgment message 230-a, acknowledgment message 230-b, and acknowledgment message 230-c in FIG. 2). Additionally, or alternatively, a host system 205 may provide the processed acknowledgment message 230 after performing one or more operations using the data, such as by using the data as part of the machine learning model to process one or more queries. By providing the processed acknowledgment message 230 to the controller 215, the host system 205 may indicate that the host system 205 is ready to process a subsequent group 210.

In some implementations, the controller 215 may provide one or more completion acknowledgment messages to the host systems 205 to indicate that each host system 205 has processed the data associated with a group 210. In some cases, the one or more completion acknowledgment messages may indicate a value of a flag (e.g., a shared variable). For example, after receiving respective processed acknowledgment messages 230 from each host system 205, the controller 215 may set the value of the flag, such as by storing a logic "1" to the flag.

In some examples, each host system 205 may periodically poll the value of the flag. The controller 215 may provide the value of the flag to the host system 205 (e.g., as a response to a polling request). Additionally, or alternatively, the controller 215 may provide the value of the flag to the host systems 205 in response to setting the value of the flag, such as by providing an interrupt message indicating the value of the flag to the host systems 205.

Alternatively, the controller 215 may provide the one or more completion acknowledgment messages based on, or associated with, supporting communication between the host systems 205. For example, the controller 215 may maintain one or more message queues, where message queues are associated with respective host systems 205. By way of example, as part of providing a processed acknowledgment message 230, the host system 205-*a* may store a message indicating that the host system 205-*a* has processed the group 210-*a* to the message queues associated with other host systems 205 (e.g., to a first message queue associated with the host system 205-*b* and to a second message queue associated with the host system 205-*c*). In such examples, the message stored to a message queue may include the group identifier associated with the group 210-*a*. In some cases, a host system 205 may periodically poll the corresponding message queue. Accordingly, after each host system 205 has stored a respective message to the message queues of the other host systems 205, the host systems 205 may determine that each host system 205 has processed the data associated with the group 210-*a*.

Based on, in response to, or otherwise associated with providing the one or more completion acknowledgment messages associated with the group 210-*a*, the system 200 may proceed to the group 210-*b*. For example, providing the one or more completion acknowledgment messages may indicate to the controller 215 that the data may be removed from the cache 225 (e.g., as part of a lock-down operation for the data). Accordingly, the controller 215 may remove the data from the cache 225. The host systems 205 may provide a plurality of second read requests for data associated with the group 210-*b*. The system 200 may continue this process, for example until the host systems 205 have processed data for each of the group(s) 210.

In some implementations, the system 200 may process multiple groups 210 concurrently. For example, if the cache 225 is sufficiently large to store multiple (e.g., two) groups 210, then the controller 215 may store both a first group 210 and a second group 210 to the cache 225 concurrently. In such implementations, the host systems 205 may request data for the second group 210 before or while processing data associated with the first group 210. Such an implementation may improve the performance of the system 200 by allowing multiple groups 210 to be processed concurrently.

By synchronizing data requests as described herein, the host systems 205, the controller 215, and/or the memory device(s) 220 may improve efficiency of providing data associated with the machine learning model to the host systems 205. For example, because host systems 205 may configure the size of a group to correspond to the size of the cache 225 of the controller 215, the controller 215 may store all or a portion of the data associated with a group to the cache 225. This may allow the controller 215 to provide the data to the host systems 205 via the cache 225, which may reduce the latency associated with the plurality of read requests. Additionally, because the host systems 205 may provide an indication of the groups to the controller 215 (e.g., via the mapping and/or one or more lock-down commands), the controller 215 may provide a single request to the memory device(s) 220. This may reduce traffic between the controller 215 and the memory device(s) 220 and thus further reduce latency.

As indicated above, FIG. 2 is provided as an example. Other examples may differ from what is described with regard to FIG. 2.

Figure 3A:
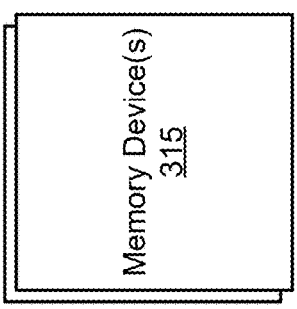
FIGS. 3A through 3C are diagrams of an example of data group synchronization.
Figure 3A:
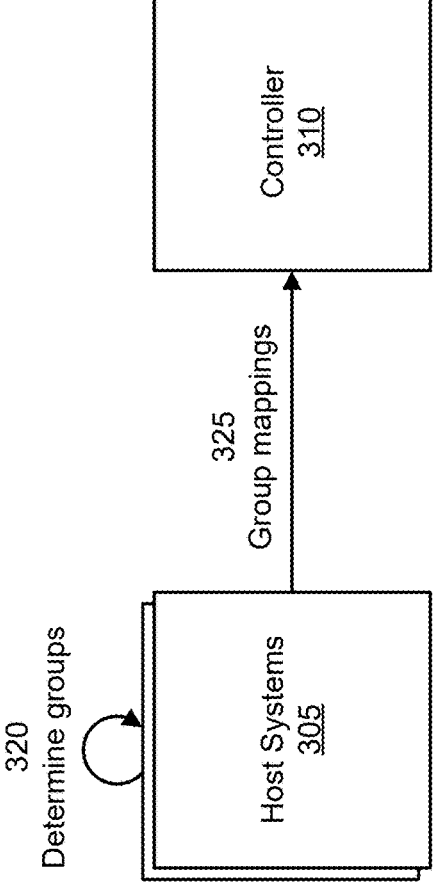
Figure 3B:
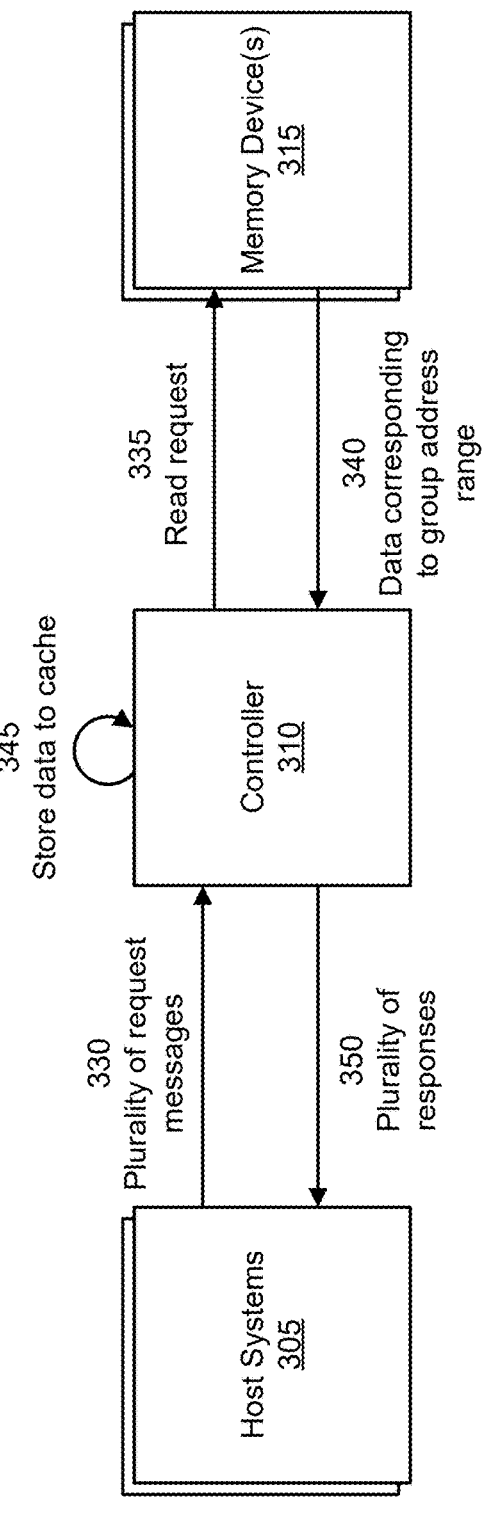
Figure 3C:
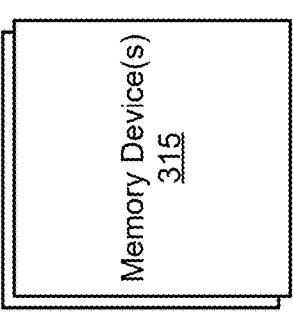
Figure 3C:
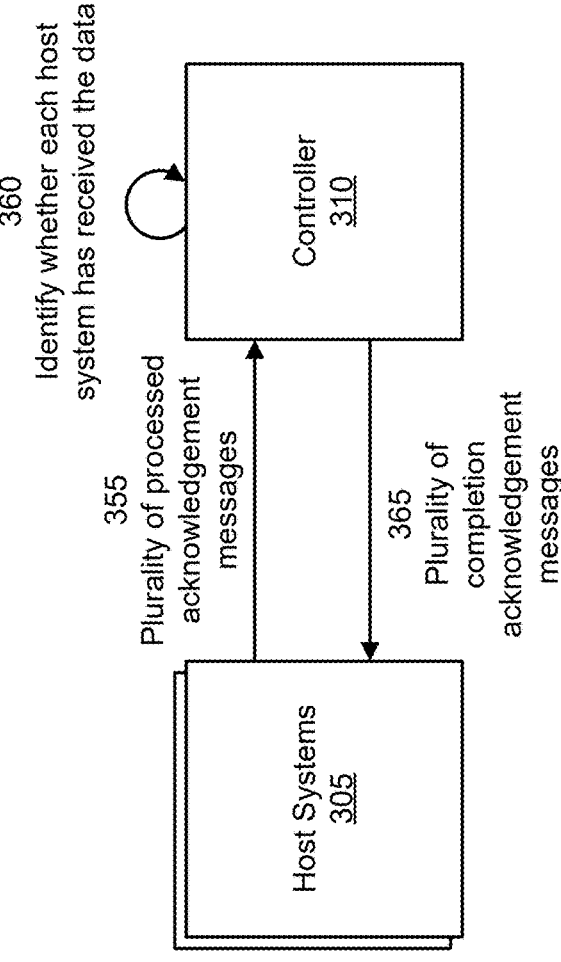

FIGS. 3A through 3C are diagrams of an example 300 of data group synchronization. The operations described in connection with FIGS. 3A-3C may be performed by the memory system 110 and/or one or more components of the memory system 110 and/or the system 200, such as the memory system controller 115, one or more memory devices 120, one or more local controllers 125, the controller 215, and/or one or more memory devices 220. Additionally, or alternatively, the operations described in connection with FIGS. 3A, 3B, and 3C may be performed by the system 100, the host system 105, one or more host systems 205, one or more components of the host system 105 (e.g., the host processor 150), and/or the host interface 140.

As shown in FIGS. 3A through 3C, the example 300 may include one or more host system(s) 305, a controller 310, and one or more memory devices 315. The host systems 305 may be examples of the host system 105 and/or the host systems 205. The controller 310 may be an example of the controller 215, the memory system controller 115, and/or one or more local controllers 125. The memory device(s) 315 may be examples of the memory device(s) 120 and/or the memory device(s) 220.

As shown in FIG. 3A, and by reference number 320, the host system(s) 305 may determine one or more groups. For example, the host system(s) 305 may organize parameters of a machine learning model into one or more groups. The host system(s) 305 may order the group(s) in accordance with the order in which a query may be processed using the parameters. For example, if the machine learning model includes a neural network having a set of layers, the host system(s) 305 may assign each layer, a portion of each layer, or portions of multiple layers, among other examples, to respective groups. The host system(s) 305 may order the group(s) in accordance with the order in which a query may be processed using the parameters. As part of generating the group(s), the host system(s) 305 may assign a respective group identifier, such as an ordinal number or ordinal value, to each group. Additionally, the host system(s) 305 may assign a respective group address range to each group. A group address range of a group may indicate the location of data associated with the group in the memory device(s) 315 (e.g., a range of one or more logical addresses of the data, a range of one or more physical addresses of the data).

In some implementations, the host system(s) 305 may determine the group(s) based on storage characteristics of the controller 310 and/or the memory device(s) 315. For example, a host system 305 may query the controller 310 to identify a size of the cache of the controller 310. The host system(s) 305 may select a size of a group to be less than or equal to the size of the cache, such that the controller 310 may support storing all or a portion of a group to the cache.

As shown by reference number 325, the host system(s) 305 may provide, and the controller may obtain, a mapping associated with the group(s). The mapping may include an association between a group identifier of a group and the associated address range of the data of the group (e.g., a group address range of the group). In response to, based on, or otherwise associated with obtaining the mapping, the controller 310 may store the mapping (e.g., to a cache or buffer of the controller 310). Alternatively, the host system(s) 305 may refrain from providing the mapping to the controller 310. In such cases, the controller 310 may be unaware of the groups. To synchronize group(s), the host system(s) 305 may provide a lock-down command to the controller 310, as described in greater detail elsewhere herein.

As shown in FIG. 3B and by reference number 330, the host system(s) 305 may provide, and the controller 310 may obtain, a plurality of request messages for data associated with a group. In some examples, a request message may indicate the group identifier associated with the group. Additionally, or alternatively, a request message may include the group address range associated with the group. As shown by reference number 335, the controller 310 may provide, and the memory device(s) 315 may obtain, a read request. The read request may indicate the group address range associated with the group. In some implementations, the controller 310 may provide a single read request to the memory device(s) 315 in response to the request messages from the host system(s) 305. For example, after providing the read request in response to the request message from the host system(s) 305, the controller 310 may refrain from providing an additional read request to the memory device(s) 315 in response to receiving a second request message from the host system(s) 305. By providing a single read request, the controller 310 may improve efficiency of communication between the controller 310 and the memory device(s) 315. For example, the controller 310 may reduce the quantity of read requests (e.g., read requests associated with additional request messages) provided to the memory device(s) 315. This may reduce unnecessary communication between the controller 310 and the memory device(s) 315, thus freeing communication resources.

As shown by reference number 340, in response to, based on, or otherwise associated with obtaining the read request, the memory device(s) 315 may provide, and the controller 310 may obtain, the data associated with the group 210-*a*. As shown by reference number 345, the controller 310 may store the data associated with the group at the cache. In some examples, the controller 310 may lock-down the data to the cache. By locking-down data associated with a group, the controller 310 may improve performance associated with accessing the data. For example, the controller 310 may provide the data to the host system(s) 305 via the cache in response to subsequent read requests, which may reduce latency associated with providing the data to the host system(s) 305.

As shown by reference number 350, the controller 310 may provide, and the host system(s) 305 may obtain, a plurality of responses that include the data associated with the group. The controller 310 may transmit the data from the cache to the host system(s) 305 (e.g., via one or more host interfaces). In some cases, the controller 310 may provide data associated with the group to the host system(s) 305 asynchronously. For example, the controller 310 may provide the data to the host system(s) 305 in response to obtaining respective request messages from the host system(s) 305.

Alternatively, the controller 310 may provide the data associated with the group by broadcasting the data to the host system(s) 305. For example, the controller 310 may include or may be a memory switch. In such examples, the controller 310 may include a set of ports (e.g., channels or interfaces), where each port couples the controller 310 with a respective host system 305. To broadcast the data, the controller 310 may transmit a respective copy of the data to each host system 305 via a respective port. In some cases, the controller 310 may perform such broadcasting concurrently (e.g., at least partially overlapping in time). By broadcasting the data, the controller 310 may improve (e.g., reduce) latency associated with providing the data to the host system(s) 305. For example, by providing copies of the data associated with the group to the host system(s) 305 concurrently, the controller 310 may reduce the time used to provide the data, compared with providing the data non-concurrently (e.g., serially).

As shown by FIG. 3C and by reference number 355, the host system(s) 305 may provide, and the controller 310 may obtain, a plurality of processed acknowledgment messages to indicate that the host system(s) 305 has processed the data associated with the group. For example, a host system 305 may provide a processed acknowledgment message after successfully receiving the data. Additionally, or alternatively, the host system 305 may provide the processed acknowledgment message after performing one or more operations using the data, such as by using the data as part of the machine learning model to process one or more queries. By providing the processed acknowledgment message to the controller 310, the host system 305 may indicate that the host system 305 is ready to process a subsequent group.

As shown by reference number 360, the controller 310 may identify whether each host system of the plurality of host systems has requested the data. For example, after receiving respective processed acknowledgment messages from each host system 305, the controller 310 may set a value of a flag, such as by storing a logic "1" to the flag.

Alternatively, the controller 310 may maintain one or more message queues, where each message queue is associated with a respective host system 305. As part of providing a processed acknowledgment message, a host system 305 may store a message indicating that the host system 305 has processed the group to the message queues associated with other host system(s) 305. In such an example, the message stored to a message queue may include the group identifier associated with the group. In some cases, the host system(s) 305 may periodically poll respective message queues. Accordingly, after each host system 305 has stored a respective message to the message queues of the other host system(s) 305, the host system(s) 305 may determine that each host system 203 has processed the data associated with the group.

As shown by reference number 365, the controller 310 may provide, and the host system(s) 305 may obtain, a plurality of completion acknowledgment messages. For example, the plurality of completion acknowledgment messages may include the value of the flag. Alternatively, the plurality of completion acknowledgment messages may include the contents of the one or more message queues. By providing the plurality of completion acknowledgment messages to the host system(s) 305, the controller 310 may indicate that each host system 305 has processed the data associated with the group. Accordingly, the host system(s) 305, the controller 310, and/or the memory devices 315 may proceed to a subsequent group. For example, the controller 310 may remove the data from the cache. The host system(s) 305, the controller 310, and/or the memory devices 315 may repeat aspects of the example 300, for example by the host system(s) 305 providing a plurality of second read request messages indicating the subsequent group.

By synchronizing data requests as described herein, the host system(s) 305, the controller 310, and/or the memory device(s) 315 may improve efficiency of providing data associated with the machine learning model to the host system(s) 305. For example, because host system(s) 305 may configure the size of a group to correspond to the size of the cache of the controller 310, the controller 310 may store all or a portion of the data associated with a group to the cache. This may allow the controller 310 to provide the data to the host system(s) 305 via the cache, which may reduce the latency associated with the plurality of read requests. Additionally, because the host system(s) 305 may provide an indication of the groups to the controller 310 (e.g., via the mapping and/or one or more lock-down commands), the controller 310 may provide a single request to the memory device(s) 315. This may reduce traffic between the controller 310 and the memory device(s) 315, and thus further reduce latency.

As indicated above, FIGS. 3A, 3B, and 3C are provided as examples. Other examples may differ from what is described with regard to FIGS. 3A, 3B, and 3C.

FIG. 4 is a flowchart of an example method 400 associated with data group synchronization. In some implementations, a controller (e.g., the memory system controller 115, a local controller 125, the controller 215, the controller 310) may perform or may be configured to perform the method 400. In some implementations, another device or a group of devices separate from or including the controller (e.g., the memory system 110, the memory system controller 115, the host system 105, the host systems 205, the host system(s) 305, the host processor 150, the host interface 140, a memory device 120, a memory device 220, a memory device 315, and/or a local controller 125) may perform or may be configured to perform the method 400. Thus, means for performing the method 400 may include the controller and/or one or more components of the controller. Additionally, or alternatively, a non-transitory computer-readable medium may store one or more instructions that, when executed by the controller, cause the controller to perform the method 400.

As shown in FIG. 4, the method 400 may include obtaining, from a host system of a plurality of host systems, a mapping between one or more group identifiers and respective group address ranges of one or more group address ranges (block 410). As further shown in FIG. 4, the method 400 may include obtaining, from respective host systems of the plurality of host systems, a plurality of request messages, the plurality of request messages comprising a group identifier, of the one or more group identifiers, corresponding to a group address range of the one or more group address ranges (block 420). As further shown in FIG. 4, the method 400 may include providing to the one or more memory devices, a read request indicating the group address range (block 430). As further shown in FIG. 4, the method 400 may include obtaining, based on providing the read request, data corresponding to the group address range from the one or more memory devices (block 440). As further shown in FIG. 4, the method 400 may include providing, based on obtaining the plurality of request messages, a plurality of responses to the respective host systems of the plurality of host systems, wherein the plurality of responses include the data (block 450).

The method 400 may include additional aspects, such as any single aspect or any combination of aspects described below and/or described in connection with one or more other methods or operations described elsewhere herein.

In a first aspect, the method 400 includes identifying, based on the plurality of request messages, whether each host system of the plurality of host systems has requested the data, and transmitting a plurality of acknowledgment messages to the plurality of host systems based on identifying that each host system of the plurality of host systems has requested the data.

In a second aspect, alone or in combination with the first aspect, the method 400 includes receiving a plurality of second acknowledgment messages from the plurality of host systems, the plurality of second acknowledgment messages indicating that the respective host systems of the plurality of host systems have received the data.

In a third aspect, alone or in combination with one or more of the first and second aspects, the method 400 includes setting a flag based on receiving the plurality of second acknowledgment messages, wherein identifying that each host system of the plurality of host systems has received the data is based on the flag being set.

In a fourth aspect, alone or in combination with one or more of the first through third aspects, the method 400 includes storing the data to a cache of the controller based on obtaining the data.

In a fifth aspect, alone or in combination with one or more of the first through fourth aspects, the method 400 includes transmitting, in response to the plurality of request messages, the data from the cache to the plurality of host systems.

In a sixth aspect, alone or in combination with one or more of the first through fifth aspects, the method 400 includes transmitting a message indicating a first size of the cache to the host system of the plurality of host systems, wherein a second size of the data is based on the first size of the cache.

In a seventh aspect, alone or in combination with one or more of the first through sixth aspects, the controller comprises a memory switch.

In an eighth aspect, alone or in combination with one or more of the first through seventh aspects, the method 400 includes broadcasting the data to the plurality of host systems.

In a ninth aspect, alone or in combination with one or more of the first through eighth aspects, the method 400 includes storing the mapping to the controller based on receiving the mapping.

Although FIG. 4 shows example blocks of a method 400, in some implementations, the method 400 may include additional blocks, fewer blocks, different blocks, or differently arranged blocks than those depicted in FIG. 4. Additionally, or alternatively, two or more of the blocks of the method 400 may be performed in parallel. The method 400 is an example of one method that may be performed by one or more devices described herein. These one or more devices may perform or may be configured to perform one or more other methods based on operations described herein.

FIG. 5 is a flowchart of an example method 500 associated with data group synchronization. In some implementations, a controller (e.g., the memory system controller 115, a local controller 125, the controller 215, the controller 310) may perform or may be configured to perform the method 500. In some implementations, another device or a group of devices separate from or including the controller (e.g., the memory system 110, the memory system controller 115, the host system 105, the host systems 205, the host system(s) 305, the host processor 150, the host interface 140, a memory device 120, a memory device 220, a memory device 315, and/or a local controller 125) may perform or may be configured to perform the method 500. Thus, means for performing the method 400 may include the controller and/or one or more components of the controller. Additionally, or alternatively, a non-transitory computer-readable medium may store one or more instructions that, when executed by the controller, cause the controller to perform the method 500.

As shown in FIG. 5, the method 500 may include obtaining, from a plurality of host systems, a plurality of request messages for data, the data being associated with a group address of one or more group addresses, and the data being associated with a group identifier of one or more group identifiers (block 510). As further shown in FIG. 5, the method 500 may include obtaining the data from the one or more memory devices based on receiving the plurality of request messages (block 520). As further shown in FIG. 5, the method 500 may include storing the data at a cache of the controller based on obtaining the data (block 530). As further shown in FIG. 5, the method 500 may include providing the data from the cache of the controller to the plurality of host systems based on storing the data at the cache of the controller (block 540). As further shown in FIG. 5, the method 500 may include obtaining a plurality of first acknowledgment messages, the plurality of first acknowledgment messages indicating that respective host systems of the plurality of host systems have received the data (block 550). As further shown in FIG. 5, the method 500 may include providing a plurality of second acknowledgment messages to the respective host systems of the plurality of host systems based on receiving a respective first acknowledgment message of the plurality of first acknowledgment messages from each host system of the plurality of host systems (block 560).

The method 500 may include additional aspects, such as any single aspect or any combination of aspects described below and/or described in connection with one or more other methods or operations described elsewhere herein.

In a first aspect, the method 500 includes storing, at a plurality of message queues associated with the respective host systems of the plurality of host systems and based on the plurality of request messages, a plurality of values indicating that the respective host systems of the plurality of host systems have received the data, wherein transmitting the plurality of second acknowledgment messages is based on the plurality of values.

In a second aspect, alone or in combination with the first aspect, the method 500 includes broadcasting the data to the plurality of host systems.

Although FIG. 5 shows example blocks of a method 500, in some implementations, the method 500 may include additional blocks, fewer blocks, different blocks, or differently arranged blocks than those depicted in FIG. 5. Additionally, or alternatively, two or more of the blocks of the method 500 may be performed in parallel. The method 500 is an example of one method that may be performed by one or more devices described herein. These one or more devices may perform or may be configured to perform one or more other methods based on operations described herein.

FIG. 6 is a flowchart of an example method 600 associated with data group synchronization. In some implementations, a controller (e.g., the memory system controller 115, a local controller 125, the controller 215, the controller 310) may perform or may be configured to perform the method 600. In some implementations, another device or a group of devices separate from or including the controller (e.g., the memory system 110, the memory system controller 115, the host system 105, the host systems 205, the host system(s) 305, the host processor 150, the host interface 140, a memory device 120, a memory device 220, a memory device 315, and/or a local controller 125) may perform or may be configured to perform the method 600. Thus, means for performing the method 600 may include the controller and/or one or more components of the controller. Additionally, or alternatively, a non-transitory computer-readable medium may store one or more instructions that, when executed by the controller, cause the controller to perform the method 600.

As shown in FIG. 6, the method 600 may include obtaining, from respective host systems of a plurality of host systems, a plurality of request messages for data associated with a first group identifier of one or more group identifiers, the group identifier corresponding to a group address range of one or more group address ranges, wherein the plurality of request messages indicate the first group identifier (block 610). As further shown in FIG. 6, the method 600 may include storing the data to a cache of the controller based on obtaining the data from the one or more memory devices (block 620). As further shown in FIG. 6, the method 600 may include providing the data to the plurality of host systems based on storing the data to the cache (block 630). As further shown in FIG. 6, the method 600 may include identifying, based on providing the data, whether each host system of the plurality of host systems has received the data (block 640). As further shown in FIG. 6, the method 600 may include providing a plurality of acknowledgment messages to the plurality of host systems based on identifying that each host system of the plurality of host systems has received the data (block 650).

The method 600 may include additional aspects, such as any single aspect or any combination of aspects described below and/or described in connection with one or more other methods or operations described elsewhere herein.

In a first aspect, the method 600 includes obtaining a mapping between the one or more group identifiers and respective group address ranges of the one or more group address ranges, and storing the mapping to the controller, wherein storing the data to the cache is based on the mapping.

In a second aspect, alone or in combination with the first aspect, the method 600 includes transmitting, in response to the plurality of request messages, the data from the cache to the plurality of host systems.

In a third aspect, alone or in combination with one or more of the first and second aspects, the method 600 includes broadcasting the data to the plurality of host systems.

In a fourth aspect, alone or in combination with one or more of the first through third aspects, the method 600 includes receiving a plurality of second acknowledgment messages from the plurality of host systems, the plurality of second acknowledgment messages indicating that the respective host systems of the plurality of host systems have received the data.

In a fifth aspect, alone or in combination with one or more of the first through fourth aspects, the method 600 includes setting a flag based on receiving the plurality of second acknowledgment messages, wherein identifying that each host system of the plurality of host systems has requested the data is based on the flag being set.

In a sixth aspect, alone or in combination with one or more of the first through fifth aspects, the method 600 includes removing the data from the cache based on the flag being set.

In a seventh aspect, alone or in combination with one or more of the first through sixth aspects, the method 600 includes providing a single read request to the one or more memory devices, the single read request indicating the group address range.

In an eighth aspect, alone or in combination with one or more of the first through seventh aspects, the method 600 includes obtaining, from the respective host systems of the plurality of host systems and based on providing the plurality of acknowledgment messages, a plurality of second request messages for second data associated with a second group identifier of the one or more group identifiers, the second group identifier corresponding to a second group address range of the one or more group address ranges, wherein the plurality of second request messages indicate the second group identifier, storing the second data to the cache of the controller based on obtaining the second data from the one or more memory devices, and providing the second data to the plurality of host systems based on storing the second data to the cache.

Although FIG. 6 shows example blocks of a method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel. The method 600 is an example of one method that may be performed by one or more devices described herein. These one or more devices may perform or may be configured to perform one or more other methods based on operations described herein.

In some implementations, a system includes one or more memory devices; and a controller configured to: obtain, from a host system of a plurality of host systems, a mapping between one or more group identifiers and respective group address ranges of one or more group address ranges; obtain, from respective host systems of the plurality of host systems, a plurality of request messages, the plurality of request messages comprising a group identifier, of the one or more group identifiers, corresponding to a group address range of the one or more group address ranges; provide, to the one or more memory devices, a read request indicating the group address range; obtain, based on providing the read request, data corresponding to the group address range from the one or more memory devices; and provide, based on obtaining the plurality of request messages, a plurality of responses to the respective host systems of the plurality of host systems, where the plurality of responses include the data.

In some implementations, a system includes one or more memory devices; and a controller configured to: obtain, from a plurality of host systems, a plurality of request messages for data, the data being associated with a group address of one or more group addresses, and the data being associated with a group identifier of one or more group identifiers; obtain the data from the one or more memory devices based on receiving the plurality of request messages; store the data at a cache of the controller based on obtaining the data; provide the data from the cache of the controller to the plurality of host systems based on storing the data at the cache of the controller; obtain a plurality of first acknowledgment messages, the plurality of first acknowledgment messages indicating that respective host systems of the plurality of host systems have received the data; and provide a plurality of second acknowledgment messages to the respective host systems of the plurality of host systems based on receiving a respective first acknowledgment message of the plurality of first acknowledgment messages from each host system of the plurality of host systems.

In some implementations, a system includes one or more memory devices; and a controller configured to: obtain, from respective host systems of a plurality of host systems, a plurality of request messages for data associated with a first group identifier of one or more group identifiers, the group identifier corresponding to a group address range of one or more group address ranges, wherein the plurality of request messages indicate the first group identifier; store the data to a cache of the controller based on obtaining the data from the one or more memory devices; provide the data to the plurality of host systems based on storing the data to the cache; identify, based on providing the data, whether each host system of the plurality of host systems has received the data; and provide a plurality of acknowledgment messages to the plurality of host systems based on identifying that each host system of the plurality of host systems has received the data.

In some implementations, an apparatus includes means for obtaining, from a host system of a plurality of host systems, a mapping between one or more group identifiers and respective group address ranges of one or more group address ranges; means for obtaining, from respective host systems of the plurality of host systems, a plurality of request messages, the plurality of request messages comprising a group identifier, of the one or more group identifiers, corresponding to a group address range of the one or more group address ranges; means for providing, to the one or more memory devices, a read request indicating the group address range; means for obtaining, based on providing the read request, data corresponding to the group address range from the one or more memory devices; and means for providing, based on obtaining the plurality of request messages, a plurality of responses to the respective host systems of the plurality of host systems, wherein the plurality of responses include the data.

In some implementations, an apparatus includes means for obtaining, from a plurality of host systems, a plurality of request messages for data, the data being associated with a group address of one or more group addresses, and the data being associated with a group identifier of one or more group identifiers; means for obtaining the data from the one or more memory devices based on receiving the plurality of request messages; means for storing the data at a cache of the controller based on obtaining the data; means for providing the data from the cache of the controller to the plurality of host systems based on storing the data at the cache of the controller; means for obtaining a plurality of first acknowledgment messages, the plurality of first acknowledgment messages indicating that respective host systems of the plurality of host systems have received the data; and means for providing a plurality of second acknowledgment messages to the respective host systems of the plurality of host systems based on receiving a respective first acknowledgment message of the plurality of first acknowledgment messages from each host system of the plurality of host systems.

In some implementations, an apparatus includes means for obtaining, from respective host systems of a plurality of host systems, a plurality of request messages for data associated with a first group identifier of one or more group identifiers, the group identifier corresponding to a group address range of one or more group address ranges, wherein the plurality of request messages indicate the first group identifier; means for storing the data to a cache of the controller based on obtaining the data from the one or more memory devices; means for providing the data to the plurality of host systems based on storing the data to the cache; means for identifying, based on providing the data, whether each host system of the plurality of host systems has received the data; and means for providing a plurality of acknowledgment messages to the plurality of host systems based on identifying that each host system of the plurality of host systems has received the data.

The foregoing disclosure provides illustration and description but is not intended to be exhaustive or to limit the implementations to the precise forms disclosed. Modifications and variations may be made in light of the above disclosure or may be acquired from practice of the implementations described herein.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

When "a component" or "one or more components" (or another element, such as "a controller" or "one or more controllers") is described or claimed (within a single claim or across multiple claims) as performing multiple operations or being configured to perform multiple operations, this language is intended to broadly cover a variety of architectures and environments. For example, unless explicitly claimed otherwise (e.g., via the use of "first component" and "second component" or other language that differentiates components in the claims), this language is intended to cover a single component performing or being configured to perform all of the operations, a group of components collectively performing or being configured to perform all of the operations, a first component performing or being configured to perform a first operation and a second component performing or being configured to perform a second operation, or any combination of components performing or being configured to perform the operations. For example, when a claim has the form "one or more components configured to: perform X; perform Y; and perform Z," that claim should be interpreted to mean "one or more components configured to perform X; one or more (possibly different) components configured to perform Y; and one or more (also possibly different) components configured to perform Z."

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A system, comprising:
one or more memory devices; and
a controller configured to:
obtain, from a host system of a plurality of host systems, a mapping between one or more group identifiers and respective group address ranges of one or more group address ranges;
obtain, from respective host systems of the plurality of host systems, a plurality of request messages, the plurality of request messages comprising a group identifier, of the one or more group identifiers, corresponding to a group address range of the one or more group address ranges;
provide, to the one or more memory devices, a read request indicating the group address range;
obtain, based on providing the read request, data corresponding to the group address range from the one or more memory devices; and
provide, based on obtaining the plurality of request messages, a respective response of a plurality of responses to each host system of the plurality of host systems, wherein each response of the plurality of responses includes a respective copy of the data.

2. The system of claim 1, wherein the controller is further configured to:
identify, based on the plurality of request messages, whether each host system of the plurality of host systems has requested the data; and
transmit a plurality of acknowledgment messages to the plurality of host systems based on identifying that each host system of the plurality of host systems has requested the data.

3. The system of claim 2, wherein the controller is further configured to:
receive a plurality of second acknowledgment messages from the plurality of host systems, the plurality of second acknowledgment messages indicating that the respective host systems of the plurality of host systems have received the data.

4. The system of claim 3, wherein the controller is further configured to:
set a flag based on receiving the plurality of second acknowledgment messages, wherein identifying that each host system of the plurality of host systems has received the data is based on the flag being set.

5. The system of claim 1, wherein the controller is further configured to:
store the data to a cache of the controller based on obtaining the data.

6. The system of claim 5, wherein, to provide the plurality of responses, the controller is configured to:
transmit, in response to the plurality of request messages, the data from the cache to the plurality of host systems.

7. The system of claim 5, wherein the controller is further configured to:
transmit a message indicating a first size of the cache to the host system of the plurality of host systems, wherein a second size of the data is based on the first size of the cache.

8. The system of claim 5, wherein the controller comprises a memory switch.

9. The system of claim 1, wherein, to provide the plurality of responses, the controller is configured to:

broadcast the data to the plurality of host systems.

10. The system of claim 1, wherein the controller is further configured to:

store the mapping to the controller based on receiving the mapping.

11. A system, comprising:

one or more memory devices; and a controller configured to:

obtain, from a plurality of host systems, a plurality of request messages for data, the data being associated with a group address of one or more group addresses, and the data being associated with a group identifier of one or more group identifiers;

obtain the data from the one or more memory devices based on receiving the plurality of request messages;

store the data at a cache of the controller based on obtaining the data;

provide a respective response of a plurality of responses, wherein each response of the plurality of responses includes a respective copy of the data, from the cache of the controller to each host system of the plurality of host systems based on storing the data at the cache of the controller;

obtain a plurality of first acknowledgment messages, the plurality of first acknowledgment messages indicating that respective host systems of the plurality of host systems have received the data; and provide a plurality of second acknowledgment messages to the respective host systems of the plurality of host systems based on receiving a respective first acknowledgment message of the plurality of first acknowledgment messages from each host system of the plurality of host systems.

12. The system of claim 11, wherein the controller is further configured to:

store, at a plurality of message queues associated with the respective host systems of the plurality of host systems and based on the plurality of request messages, a plurality of values indicating that the respective host systems of the plurality of host systems have received the data, wherein transmitting the plurality of second acknowledgment messages is based on the plurality of values.

13. The system of claim 11, wherein, to provide the data, the controller is configured to:

broadcast the data to the plurality of host systems.

14. A system, comprising:

one or more memory devices; and a controller configured to:

obtain, from respective host systems of a plurality of host systems, a plurality of request messages for data associated with a first group identifier of one or more group identifiers, the first group identifier corresponding to a group address range of one or more group address ranges, wherein the plurality of request messages indicate the first group identifier;

store the data to a cache of the controller based on obtaining the data from the one or more memory devices;

provide a respective response of a plurality of responses, wherein each response of the plurality of responses includes a respective copy of the data, to each host system of the plurality of host systems based on storing the data to the cache;

identify, based on providing the data, whether each host system of the plurality of host systems has received the data; and provide a plurality of acknowledgment messages to the plurality of host systems based on identifying that each host system of the plurality of host systems has received the data.

15. The system of claim 14, wherein the controller is further configured to:

obtain a mapping between the one or more group identifiers and respective group address ranges of the one or more group address ranges; and store the mapping to the controller, wherein storing the data to the cache is based on the mapping.

16. The system of claim 14, wherein, to provide the data to the plurality of host systems, the controller is configured to:

transmit, in response to the plurality of request messages, the data from the cache to the plurality of host systems.

17. The system of claim 16, wherein, to transmit the data, the controller is configured to:

broadcast the data to the plurality of host systems.

18. The system of claim 17, wherein the controller is further configured to:

receive a plurality of second acknowledgment messages from the plurality of host systems, the plurality of second acknowledgment messages indicating that the respective host systems of the plurality of host systems have received the data.

19. The system of claim 18, wherein the controller is further configured to:

set a flag based on receiving the plurality of second acknowledgment messages, wherein identifying that each host system of the plurality of host systems has requested the data is based on the flag being set.

20. The system of claim 19, wherein the controller is further configured to:

remove the data from the cache based on the flag being set.

21. The system of claim 14, wherein, to obtain the data from the one or more memory devices, the controller is configured to:

provide a single read request to the one or more memory devices, the single read request indicating the group address range.

22. The system of claim 14, wherein the controller is further configured to:

obtain, from the respective host systems of the plurality of host systems and based on providing the plurality of acknowledgment messages, a plurality of second request messages for second data associated with a second group identifier of the one or more group identifiers, the second group identifier corresponding to a second group address range of the one or more group address ranges, wherein the plurality of second request messages indicate the second group identifier;

store the second data to the cache of the controller based on obtaining the second data from the one or more memory devices; and provide the second data to the plurality of host systems based on storing the second data to the cache.

* * * * *